United States Patent [19]

Luginbühl

[11] 4,176,993
[45] Dec. 4, 1979

[54] APPARATUS FOR FORMING STACKS OF FLAT OBJECTS

[75] Inventor: Pierre Luginbühl, Neuhausen am Rheinfall, Switzerland

[73] Assignee: S I G Schweizerische Industrie-Gesellschaft, Neuhausen am Rheinfall, Switzerland

[21] Appl. No.: 876,148

[22] Filed: Feb. 8, 1978

[30] Foreign Application Priority Data

Feb. 11, 1977 [CH] Switzerland .................. 1697/77

[51] Int. Cl.$^2$ ............................................. B65G 57/00
[52] U.S. Cl. ................................... 414/106; 414/46; 53/247; 198/441; 414/680
[58] Field of Search ............ 214/113 D, 147 T, 6 TS, 214/6.5, 7, 6 R, 1 PB, 8.5 R, 8.5 A, 8.5 H, 8.5 SS, 8.5 K; 53/244, 253, 242, 258, 251, 252; 198/431, 441, 482, 803, 483, 480; 414/106, 46, 680

[56] References Cited

U.S. PATENT DOCUMENTS

| 2,067,525 | 1/1937 | Flaherty ........................... 214/7 X |
|---|---|---|
| 2,154,757 | 4/1939 | Labombarde ................... 214/7 X |
| 2,252,845 | 8/1941 | Gantzer ...................... 214/8.5 H X |
| 3,642,114 | 2/1972 | Crispe et al. ................. 198/441 X |
| 3,876,083 | 4/1975 | Evans et al. ...................... 214/7 |
| 3,904,077 | 9/1975 | Luginbuhl ................. 214/8.5 A X |
| 4,053,066 | 10/1977 | Lynch ............................ 198/431 X |
| 4,056,200 | 11/1977 | Provost ............................... 214/7 |

FOREIGN PATENT DOCUMENTS

| 532522 | 2/1973 | Switzerland . |
|---|---|---|
| 430393 | 6/1935 | United Kingdom ................. 214/7 |
| 1298171 | 11/1972 | United Kingdom ............ 214/8.5 SS |

*Primary Examiner*—Frank E. Werner
*Attorney, Agent, or Firm*—Spencer & Kaye

[57] ABSTRACT

Apparatus for forming stacks of flat objects, such as chocolate bars, which includes a toothed wheel to which juxtaposed objects are fed while traveling on an at least horizontal input path, and between the teeth of which the objects are accommodated and are then moved to the area of a stacking station through rotation of the wheel, with the toothed wheel being composed of two toothed dics spaced apart along the axis of the wheel and each provided with circumferentially spaced teeth defining object retaining pockets between successive teeth, and the apparatus further being provided with a plunger device operatively associated with the wheel for pushing each object arriving at the end of the input path into a respective pocket when such pocket is situated at the top of the wheel and for braking the next following object on the input path to synchronize the introduction of objects with the rotation of the wheel, the wheel being driven in continuous rotation and objects being supplied continuously thereto during operation of the apparatus.

8 Claims, 4 Drawing Figures

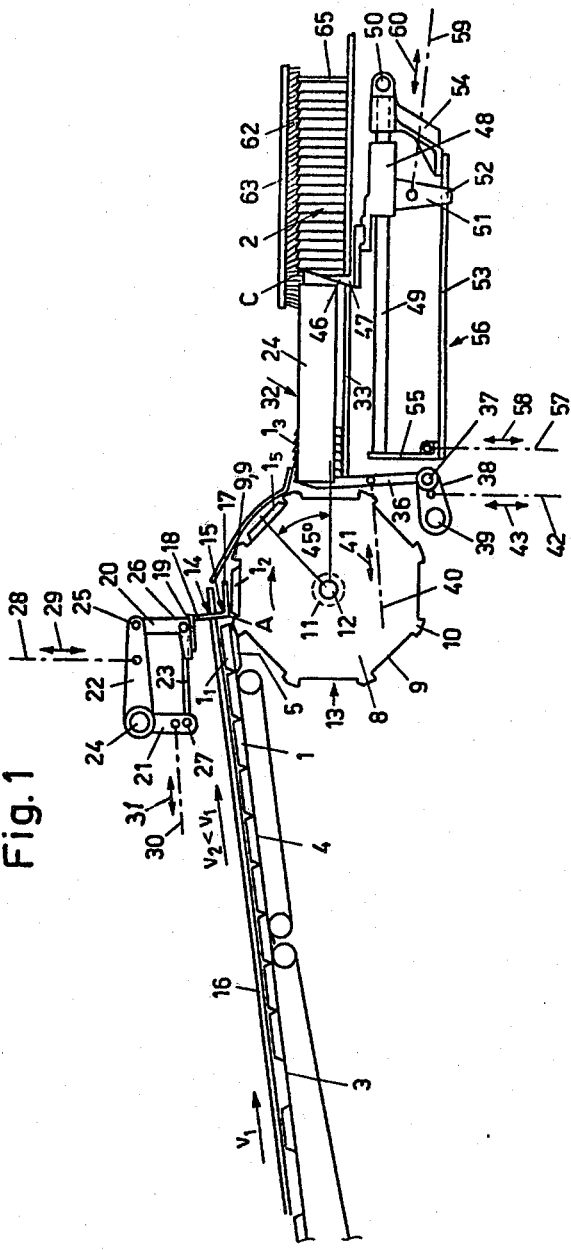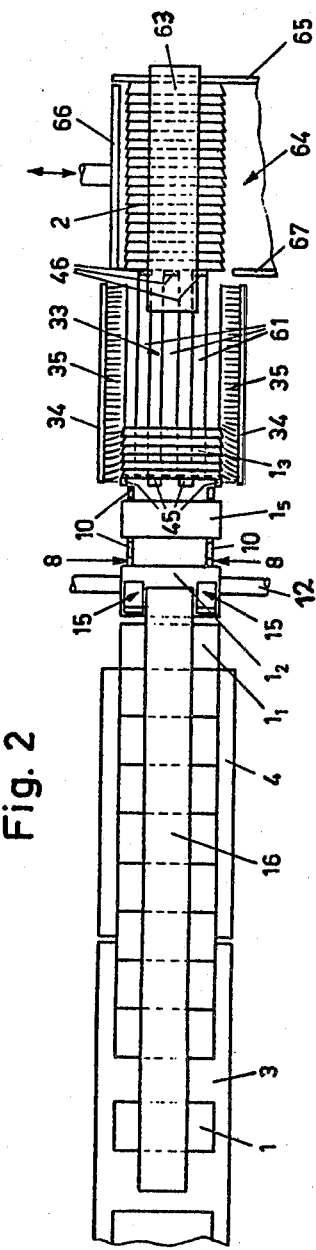

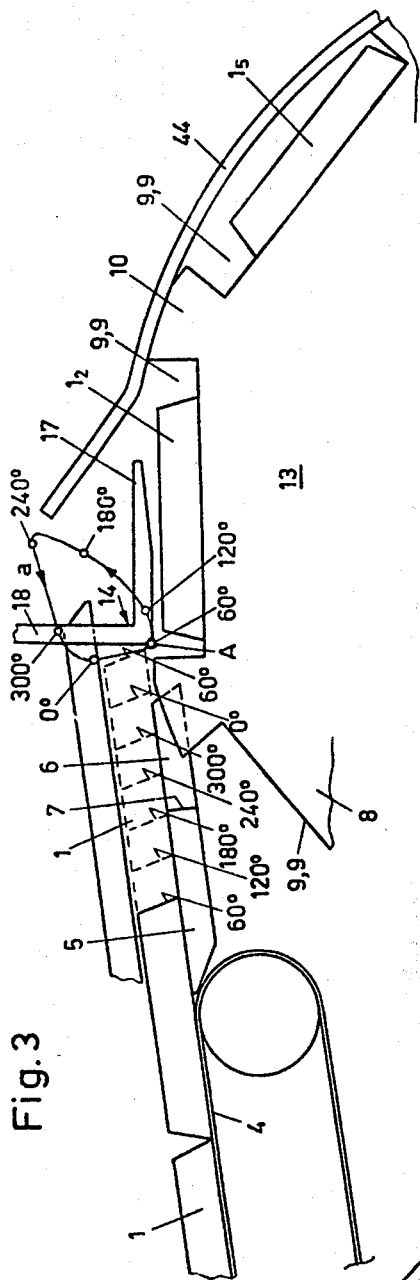
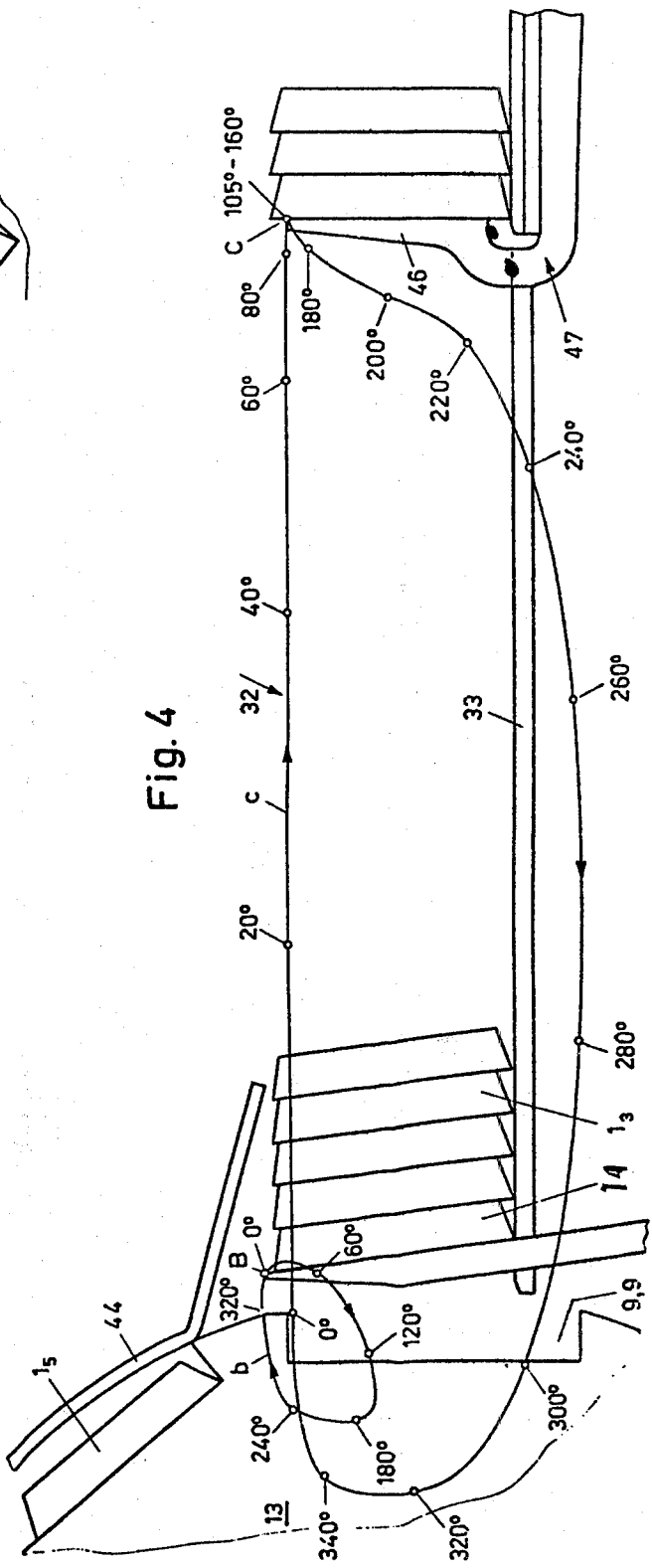

4,176,993

APPARATUS FOR FORMING STACKS OF FLAT OBJECTS

BACKGROUND OF THE INVENTION

The present invention relates to an apparatus for forming stacks of flat objects, e.g. chocolate bars, in which juxtaposed objects are brought to a toothed wheel along an at least approximately horizontal path, are accepted between the teeth of the toothed wheel and are then brought into the region of a stacking station by rotation of the toothed wheel.

An apparatus of this type is disclosed in Swiss Pat. No. 532,522 and includes a toothed wheel which is driven intermittently and which remains at a standstill until the number n of objects intended for each stack has accumulated against the short sides of successive teeth, whereupon the toothed wheel is rotated by n tooth divisions, discharging n objects in succession which are transported away in the form of uniform stacks by two endless conveyor belts.

These known devices operate excellently but their output is not as high as is presently desired. More specifically, they are not capable of properly grouping more than 100 objects per minute.

SUMMARY OF THE INVENTION

It is an object of the present invention to overcome this drawback and permit higher output rates.

This and other objects are achieved according to the present invention, by the provision of a toothed pocket wheel which is composed of two laterally spaced toothed discs having circumferentially spaced teeth which form pockets between successive teeth to accommodate the objects, and a plunger which pushes the foremost object being delivered to the wheel into the pocket then at the top of the toothed wheel and simultaneously brakes the next following object so that the introduction of the objects is synchronized with the rotation of the pocket wheel, the introduction of objects and the rotation of the wheel being continuous.

For reasons to be explained in greater detail below, this arrangement permits a great increase in production rate to approximately three to four times that realized previously.

BRIEF DESCRIPTION OF THE DRAWINGS

FIG. 1 is an elevational side view of one preferred embodiment of a stacking device according to the invention.

FIG. 2 is a plan view of the apparatus shown in FIG. 1, with several components removed to facilitate illustration.

FIG. 3 is a detail elevational view of a portion of the arrangement of FIG. 1, shown to a larger scale.

FIG. 4 is a further detail elevational view of another portion of the arrangement of FIG. 1 shown to a larger scale.

DESCRIPTION OF THE PREFERRED EMBODIMENTS

The apparatus shown in FIGS. 1-4 is intended to stack individually prepackaged chocolate bars 1 in stacks 2 of, for example, twenty bars with each stack then in a horizontal orientation, and to bring the successively formed stacks 2 to a packaging machine (not shown) which packs the same in, for example, cardboard boxes. At the input of the apparatus there is disposed a first endless belt 3 which conveys the bars 1 at a speed $v_1$ which is greater than the speed $v_2$ of a subsequent endless belt 4. Belt 4 is followed by a short, stationary table 5 whose end portion 6 is, as shown in FIG. 3, somewhat narrowed by lateral shoulders 7, so that the end portion can fit between two laterally spaced toothed discs 8.

The two toothed discs 8, which are each provided with eight teeth 10 separated circumferentially from one another by wide gaps 9, are firmly connected together by means of a hub 11 which is secured on a shaft 12 arranged to rotate continuously when the apparatus is in operation.

The toothed discs 8 and the hub 11 form a pocket wheel 13 according to the invention in which the pockets 9, 9 formed by the aligned gaps 9 of the two discs 8 serve to receive, transport and place upright the bars 1. The toothed discs 8 may also be individually fastened to the shaft 12 without a hub and may then form a pocket wheel 13 with the shaft.

If the bar $1_1$ which is currently present on table 5, is pushed beyond the end portion 6 of the table by the following bars 1 carried on belt 4, it drops into the pocket 9, 9 of pocket wheel 13 disposed therebelow as shown in $1_2$. Since the natural falling movement would be too slow to be compatible with the high operating speed of the apparatus, that movement is augmented by the action of a plunger 14 which pushes the bar downwardly into the pocket.

The plunger 14 is composed of two laterally spaced parts 15 each having an L-shaped profile, as is apparent from FIGS. 2 and 3, which protrude downwardly adjacent respective sides of the end of a centrally located cover strip 16 which is disposed above belts 3 and 4 in order to prevent the bars 1 from being pushed on top of one another. Each L-shaped member 15 has an approximately vertical arm 18 from the lower end of which an approximately horizontal arm 17 projects in the downstream direction.

The two vertical arms 18 are connected together at their upper ends by a plate 19 which is fastened to a connecting rod 20. Opposite the connecting rod 20 there is a lever 21 identical in length to rod 20 and pivotally connected to rod 20 by means of a further lever 22 and rod 23 identical to one another in length, to form a linkage.

Levers 21 and 22 of the thus formed parallelogram linkage 20-23 are pivotal about a stationary axis 24 while the three other pivot joints 25, 26 and 27 are freely movable. A tie rod 28 is pivotally connected to lever 21 to be movable back and forth in the sense of the double arrow 29 by means of a cam disc (not shown). Additionally, a tie rod 30 is pivotally connected to lever 21 to be movable back and forth in the sense of the double arrow 31, also by means of a cam disc (not shown).

A complete cycle of back and forth movements of the tie rods 28 and 30 takes place in the time interval which corresponds to the rotation of the pocket wheel 13 by one pocket interval, i.e. in the present case during the period of a 45° rotation of the pocket wheel 13. By appropriate selection of the cam discs controlling rods 28 and 30, based on principles well known in the art, the corner point A of the L-shaped members 15 can be made to follow the closed curve a shown in FIG. 3.

If one considers a complete cycle of movement of the plunger to cover 360°, the corresponding positions of corner A along curve a and of the frontal face of bar $1_1$ on table 5 are shown for phase positions spaced apart by 60°, i.e. 0° (=360°), 60°, 120°, etc. When plunger 14 is in the position shown in FIG. 3, it has just completed pushing bar $1_2$ into uppermost pocket 9, 9. It is clear that at the 60° phase position, bar $1_1$ abuts a small distance above point A on the faces of the two vertical arms 18. This has a synchronizing effect on the supply of bars in that if a bar $1_1$ reaches the position shown in FIG. 3 a bit too early, it is braked for a small fraction of a second by the faces of the vertical arms 18 above corner A, which braking is transferred to all following bars 1 but involves such a slight retardation that the advancing speed of bar 1 is reduced only by a few percent and therefore is negligible compared to the complete stopping of the bars required in prior art devices.

The alignment of bars 1 on belt 4 without any gaps therebetween is accomplished in that, as already mentioned, the speed $v_1$ of the preceding belt 3 on which the bars 1 may have irregular spacings, is greater than the speed $v_2$ of belt 4, resulting in accumulation of bars 1 already on the end portion of belt 3. The braking action effected by plunger 14 results only in a very slight additional accumulation and precisely synchronizes the advance of bars 1 under the action of belt 4 with the movement of the pocket wheel 13 and the plunger 14.

The horizontal bar $1_2$ injected into the uppermost pocket 9, 9 is brought into a vertical position $1_3$ by rotation of the pocket wheel 13 through two pocket intervals, or divisions, of 45° each, the bar passing through position $1_5$ shown in FIGS. 1, 2 and 3. Thus, the bar is placed, in a manner to be explained in detail below, at the beginning, or input end, of a grouping channel 32 which is formed by a bottom 33 and two side walls 34. The inside of each side wall 34 is provided with an array of bristles 35 which permit advancement of the bars $1_3$ along bottom 33 but support their short narrow sides and thus prevent them from toppling over.

A forked plunger 36 is provided to remove each bar from pocket 9, 9 when it reaches a vertical orientation. The forked plunger is articulated at a joint 37 to a lever arm 38 which is pivotal on a stationary shaft 39. An approximately horizontal tie rod 40 which is moved back and forth in the sense of double arrow 41 by a cam disc (not shown) is pivotally connected to forked plunger 36. Analogously, an approximately vertical tie rod 42, which is moved up and down in the sense of the double arrow 43, is pivotally connected to lever arm 38. The two cam discs associated with rods 40 and 42 are designed, also according to principles well known in the art, so that, as shown in FIG. 4, the end point B of the forked plunger 36 traverses a closed curve b during each 45° rotation of the pocket wheel 13. During this movement, forked plunger 36 pivots back and forth about joint 37 under the action of rod 40 while the latter is moved up and down by rod 42.

At the instant shown in FIG. 4, when the pocket 9, 9 under consideration has a vertical position, point B is disposed at the 0° point of curve b, this being after plunger 36 has already moved the associated bar out of the pocket and into position $1_4$ on bottom 33. The points on curve b marked 60°, 120°, 180°, etc., indicate the successive locations of point B after each further rotation of pocket wheel 13 by 1/6 of 45°.

It can be seen that beginning at the 0° position, the forked plunger 36 initially displaces bar $1_4$, and with it the preceding, or downstream, bars $1_3$, a bit further into channel 32, but then quickly retracts in order to push forward again after reaching the 180° position. The plunger finally reaches, and takes over guidance of, the plunger $1_5$ which is in the next following pocket, i.e. the pocket then arriving in the vertical position, when point B reaches the area between the 240° and 320° positions, whereupon the bar slides downwardly into the $1_4$ position and the steps are repeated. A curved cover plate 44 is provided to prevent inadvertent, accidental removal of the bar from its pocket before reaching the effective region of plunger 36.

As can be seen in FIG. 2, the forked plunger 36 in the present embodiment has four tines 45, the upper ends of all of which are indicated by point B in FIG. 4. Of these tines 45, the two inner tines engage bar $1_5$ between toothed discs 8 while the two outer, somewhat narrower tines 45 engage the same bar outside of toothed discs 8. As shown in FIGS. 1, 2 and 4, the four tines 45 are arranged so that the three tines 46 of a forked slide 47 are able to pass between the same. The forked slide 47 is intended to push bars $1_3$ which are present in grouping channel 32 into a starting position as soon as the group, or stack, has become complete. FIGS. 1 and 2 show a complete stack 2 which contains, for example twenty bars 1 in this starting position.

The three-tined forked slide 47 is fastened to a slide sleeve 48 which slides on a pivotal rod 49 that is pivotal about a stationary pin 50. The lower end 52 of an arm 51 of slide sleeve 48 is guided, for example, by means of a fork, on a rod 53 which is parallel to rod 49 and which is firmly connected at its ends by means of connecting pieces 54 and 55 with rod 49 to form a closed frame 56. A tie rod 57 is pivotally connected to frame 56 to be moved up and down in the sense of the double arrow 58 by means of a cam disc (not shown) and thus pivots frame 56 about pin 50. Analogously, a tie rod 59 is pivotally connected to arm 51 to be moved back and forth in the sense of the double arrow 60 by means of a cam disc so as to displace the sleeve 48 bearing the forked slide 47 on the pivotal rod 49. The two cam discs are dimensioned and configured, also according to principles well known in the art, so that the upper edge C of the pushing surface of forked slide 47 passes once over the closed curve c shown in FIG. 4 during each rotation of the pocket wheel through an angle of 20°·45°=2°·360°+180°=900°. On curve c the phase positions at which the end point C is disposed if an angle of 360° is associated with a complete circuit of the path of curve c are indicated as 0°, 20°, 40°, etc. Thus, the phase positions of point C do not correspond directly with those of points A and B.

Phase position 0° of point C has been selected to lie slightly ahead of that position in which the forked slide 47 relieves the forked plunger 36 and begins to push the twenty bars $1_3$ present in the grouping channel 32 ahead of it. The tines 46 of the forked slide 47 then pass between the elongate slits 61 provided in the bottom 33 of the channel, as shown in FIG. 2.

It can be seen from FIG. 4 that point C passes very quickly through the initial part of the upper portion of curve c and then travels more and more slowly and finally comes to a standstill at a reversal point between 105° and 160° on its closed curve c. The forked slide 47 is shown in FIG. 4 at just that reversal point. Point C passes through the lower portion of curve c with increasing speed, and then moves slowly but without stopping to the start of the upper portion thereof.

It must be noted that the movement of point C can very well be realized without frame 56 if the tie rod 57 is articulated directly to pivotal rod 49. However, frame 56 prevents tilting and jamming of the slide sleeve 48 on the pivotal rod 49.

When the forked slide 47 has brought the stack 2 into its starting position shown in FIGS. 1 and 2, the stack is no longer being held upright by the lateral brush walls 34, 45, but instead by a cover plate 63 which is equipped with downwardly extending bristles 62. The stack is also no longer supported at the bottom of channel 33 but on an output path 64 which extends perpendicular to channel 33 and which is provided with a wall 65 on its side opposite the fork tines 46. The stack abuts against this wall 65. A slide 66 is mounted to be moved back and forth in the direction of output path 64 to convey the stack 2 on this path 64, particularly into a box folding mechanism of known type in which the stack 2 is packaged in a cardboard enclosure. During displacement, the stack 2 is guided by wall 65, on the one hand, and by forked tines 46 and then a wall 67 disposed opposite the outlet portion of wall 65, on the other hand.

The above-described apparatus is capable of producing a very high output without malfunction. For example, 300-400 bars 1 can be grouped per minute into stacks 2 and, correspondingly, 15-20 cartons holding twenty bars each can be produced per minute. Conversion to stacks having other numbers of bars or other thicknesses of the bars is easily achieved by appropriate change in the transmission ratio between the drive for pocket wheel 13 and the drive for the forked slide 47 as well as a few other easily accomplished measures.

In the illustrated and described embodiment of the present invention the grouping channel 32 is offset with respect to the point of injection at the periphery of the pocket wheel 13 by about 90° and is horizontally aligned. Of course, the grouping channel 32 could also be disposed at another point relative the injection station and could be oriented accordingly.

It will be understood that the above description of the present invention is susceptible to various modifications, changes and adaptations, and the same are intended to be comprehended within the meaning and range of equivalents of the appended claims.

What is claimed is:

1. In apparatus for forming stacks of flat objects, including a toothed wheel to which juxtaposed objects are fed while traveling on an at least approximately horizontal input path, and between the teeth of which the objects are accommodated and are then moved to the area of a stacking station by way of rotation of the toothed wheel, the improvement wherein said toothed wheel is composed of two toothed discs spaced apart along the axis of said wheel and each provided with circumferentially spaced teeth defining object retaining pockets between successive teeth, a given spacing existing between successive pockets along the circumference of said wheel, and said apparatus further comprises: plunger means operatively associated with said wheel for pushing each object arriving at the end of the input path into a respective pocket when such pocket is situated at the top of said toothed wheel and for braking the next following object on the input path to synchronize the introduction of objects with the rotation of said wheel, said wheel being driven in continuous rotation and objects being supplied continuously thereto during operation of said apparatus; means defining an object grouping channel having an inlet end disposed adjacent said wheel at a location spaced circumferentially from the location of introduction of objects into said wheel pockets; and means defining a forked plunger operatively associated with said wheel, said forked plunger being driven over a path defined by a closed curve for transferring each object from said wheel to said inlet end of said grouping channel after such object has been carried by said wheel through a certain distance from the location of introduction into a respective wheel pocket, and wherein said forked plunger is driven in a manner such that a reference point thereon traverses a complete cycle of the closed curve defining its path during each rotation of said wheel by an amount equal to the given spacing between successive pockets.

2. Apparatus as defined in claim 1 wherein said input path is constituted by two endless conveyor belts disposed in succession along the input path, with that one of said belts which is located upstream along the input path having a higher conveying speed than the other one of said belts.

3. In apparatus for forming stacks of flat objects, including a toothed wheel to which juxtaposed objects are fed while traveling on an at least approximately horizontal input path, and between the teeth of which the objects are accommodated and are then moved to the area of a stacking station by way of rotation of the toothed wheel, the improvement wherein said toothed wheel is composed of two toothed discs spaced apart along the axis of said wheel and each provided with circumferentially spaced teeth defining object retaining pockets between successive teeth, a given spacing between successive pockets along the circumference of said wheel, and said apparatus further comprises: plunger means operatively associated with said wheel for pushing each object arriving at the end of the input path into a respective pocket when such pocket is situated at the top of said toothed wheel and for braking the next following object on the input path to synchronize the introduction of objects with the rotation of said wheel, said wheel being driven in continuous rotation and objects being supplied continuously thereto during operation of said apparatus; means defining an object grouping channel having an inlet end disposed adjacent said wheel at a location spaced circumferentially from the location of introduction of objects into said wheel pockets; means defining a forked plunger operatively associated with said wheel, said forked plunger being driven over a path defined by a closed curve for transferring each object from said wheel to said inlet end of said grouping channel after such object has been carried by said wheel through a certain distance from the location of introduction into a respective wheel pocket; and means defining a forked slide associated with said grouping channel to operate after a selected number of transferring operations are performed by said forked plunger, so as to move ahead of said forked plunger and thus push a stack of the selected number of objects produced in said grouping channel into a starting position.

4. Apparatus as defined in claim 3 wherein said forked slide is driven in a manner such that a reference point thereon traverses a complete cycle of the closed curve defining its path during each rotation of said wheel by an amount equal to an integral multiple of the given spacing between successive pockets, which integral is equal to the selected number of objects in the stack, and such that the reference point stops for a short time at a reversal point of such curve.

5. Apparatus as defined in claim 3 wherein said grouping channel is provided with a bottom having longitudinal slits and said forked slide is composed of a plurality of tines which pass through said slits during operation of said forked slide.

6. Apparatus as defined in claim 5 wherein said grouping channel is provided with side walls which have inwardly directed bristles to maintain each object in an upright position after it has been transferred to said grouping channel.

7. Apparatus as defined in claim 3 further comprising: means defining an outlet path having its starting end disposed at the end of said grouping channel and extending perpendicular to said grouping channel and including an abutment wall located at the side of said outlet path which is remote from said grouping channel and extending along the length of said outlet path, the starting position into which the stack of objects is pushed by said forked slide being located on the starting end of said outlet path; and a slide member arranged for advancing a stack of objects along said outlet path from the starting position under lateral guidance by said abutment wall and, near said starting end of said outlet path, by said forked slide.

8. In apparatus for forming stacks of flat objects, including a toothed wheel to which juxtaposed objects are fed while traveling on an at least approximately horizontal input path, and between the teeth of which the objects are accommodated and are then moved to the area of a stacking station by way of rotation of the toothed wheel, the improvement wherein said toothed wheel is composed of two toothed discs spaced apart along the axis of said wheel and each provided with circumferentially spaced teeth defining object retaining pockets between successive teeth, a given spacing existing between successive pockets along the circumference of said wheel, and said apparatus further comprises plunger means operatively associated with said wheel for pushing each object arriving at the end of the input path into a respective pocket when such pocket is situated at the top of said toothed wheel and for braking the next following object on the input path to synchronize the introduction of objects with the rotation of said wheel, said wheel being driven in continuous rotation and objects being supplied continuously thereto during operation of said apparatus, and wherein said plunger means include a member having an L-shaped profile composed of an at least approximately horizontal arm for injecting each object into a respective pocket, and an at least approximately vertical arm, said member being movable in a manner such that the corner point of said profile traverses a complete cycle of a path defined by a closed curve during each rotation of said wheel by an amount equal to the given spacing between successive pockets, while the leading narrow side of the object following that being injected into a pocket abuts on the face of the vertical arm of said member.

* * * * *